C. A. CYPHERS.
HOLDER FOR INCUBATOR THERMOMETERS.
APPLICATION FILED DEC. 28, 1907.
926,549.
Patented June 29, 1909.
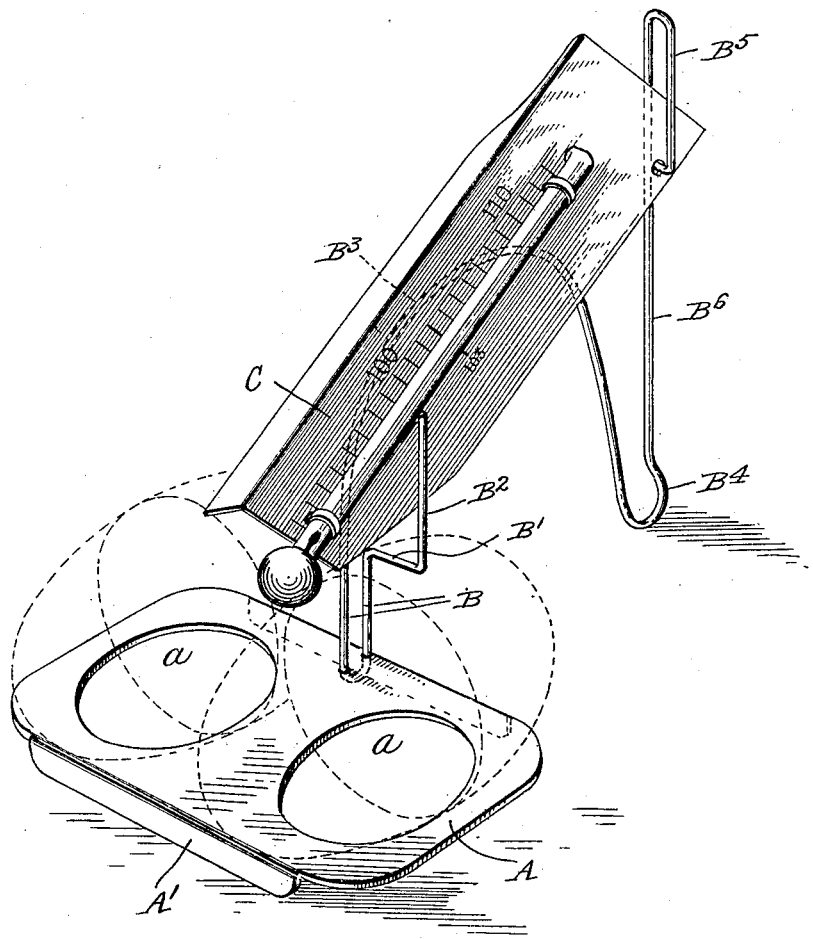
Witnesses
Inventor
Charles A. Cyphers,
By Church & Church
his Attorneys

UNITED STATES PATENT OFFICE.

CHARLES A. CYPHERS, OF BUFFALO, NEW YORK, ASSIGNOR TO MODEL INCUBATOR COMPANY, OF BUFFALO, NEW YORK, A CORPORATION OF NEW YORK.

HOLDER FOR INCUBATOR-THERMOMETERS.

No. 926,549.      Specification of Letters Patent.      Patented June 29, 1909.

Application filed December 28, 1907. Serial No. 408,418.

*To all whom it may concern:*

Be it known that I, CHARLES A. CYPHERS, of Buffalo, in the county of Erie and State of New York, have invented a certain new and useful Improvement in Holders for Incubator-Thermometers; and I do hereby declare the following to be a full, clear, and exact description of the same, reference being had to the accompanying drawings, forming a part of this specification, and to the figures and letters of reference marked thereon.

This invention relates to devices for use in incubators, the objects being to provide a holder with which the bulb of the thermometer employed for indicating the temperature, will be held in contact with one or more eggs so as to be influenced by the egg temperature rather than solely by the temperature of the air in the egg chamber.

A further object of the invention is to provide a device which may be located in any convenient position in the egg chamber without disturbing the orderly arrangement of eggs therein and which will not only hold the thermometer and eggs with which the latter is in contact but which will accommodate eggs of varying size or shape and permit the eggs to be moved or turned in accordance with proper practice to insure successful incubation.

The accompanying drawing is a perspective view of a holder and thermometer embodying the present invention, the eggs with which the thermometer contacts being shown in dotted lines.

The holder embodies a base A having seats for two eggs and may conveniently consist of a sheet metal plate with down turned flanges A' at front and back and with oblong recesses or openings forming the egg seats $a$.

A frame, preferably formed of a single length of wire, constitutes the thermometer support of the holder, thus, as shown, a doubled portion B of the wire is connected centrally to one side of the base by solder or otherwise. One of the reaches of the wire above the base is bent to form a supporting bar B' and a side guide $B^2$ while the other reach is curved over in the form of an arch $B^3$ terminating in a reverse bend or foot $B^4$ adapted to rest on the floor of the egg chamber at some distance from the base A. The portion $B^6$ of the wire extending up from the foot is adapted for connection with the outer end of the thermometer and for this purpose it is preferably formed into a long loop $B^5$.

The thermometer C is mounted with its rear end projecting into the loop $B^5$, the lower side of the loop preferably passing through an opening or bearing in the thermometer plate so as to form a pivotal connection, thus by opening the loop one thermometer may be substituted for another.

At its forward end, the thermometer rests on the supporting bar between the arch and vertical guide and the bulb projects into proximity to the egg seats, or in position to rest on or between and in contact with the eggs on the seats. Ordinarily when the eggs are in place, they will support the thermometer above the supporting bar and inasmuch as the thermometer is pivotally supported by the holder and has a considerable range of lateral movement between the vertical guides, it readily positions itself in contact with the eggs regardless of their size or shape. By having the bulb of the thermometer in contact with two eggs the instrument is steadied, contact with the eggs is insured and the temperature indicated is more certainly that of the fertile eggs in the chamber.

The base practically occupies no greater area in the egg chamber than the eggs themselves and the supporting leg or foot will pass down between the surrounding eggs without disturbing them in any way.

Having thus described my invention, what I claim as new and desire to secure by Letters Patent, is:

1. As an improved article of manufacture, a movable egg and thermometer holder for incubators embodying a base having a seat in which an egg may rest and be supported in substantially fixed position with relation to the holder, and means connected with said base for movably supporting a thermometer with its bulb in position to rest by gravity on the egg held in said seat.

2. As an improved article of manufacture, a movable egg and thermometer holder for incubators embodying a base having an open seat on the upper side of the same in which an egg may rest and be supported in substantially fixed position with relation to the holder, a thermometer support projecting upwardly from said base at one side of the seat, and a thermometer carried by said support with its bulb in proximity to but movable with relation to said seat and adapted to rest by gravity on an egg held in the seat.

3. As an improved article of manufacture, a movable egg and thermometer holder for incubators embodying a base having two proximate open seats on the upper side for supporting two eggs in proximity to each other and in substantially fixed position with relation to the base, a thermometer support projecting upwardly from the base and a thermometer carried by the support with its bulb above the space between the seats and movable toward and from the base, whereby it is adapted to rest on the proximate sides of the two eggs held in the seats.

4. A movable holder such as described for use in incubators embodying a base having egg seats therein, an upwardly projecting thermometer holder connected with said seat and a thermometer pivotally engaging the thermometer holder at one end and having the bulb at its opposite end supported in proximity to the egg seats.

5. A device such as described for use in incubators, embodying a base having egg seats therein, an upwardly projecting thermometer holder secured to the base and embodying means for supporting a thermometer with its bulb in proximity to the seats for the eggs, and having a narrow downwardly extending leg.

6. A movable holder such as described embodying a base having an egg seat and a thermometer pivotally supported by the holder with its bulb in proximity to the egg seat.

7. A movable holder such as described, embodying a base having an egg seat and upwardly projecting thermometer guides and a thermometer pivotally supported by the holder and projecting between the guides with its bulb in proximity to the egg seat.

CHAS. A. CYPHERS.

Witnesses:
LOUISE DODSON,
RICHARD A. PIKE.